United States Patent
Dhong et al.

(10) Patent No.: US 6,760,819 B2
(45) Date of Patent: Jul. 6, 2004

(54) SYMMETRIC MULTIPROCESSOR COHERENCE MECHANISM

(75) Inventors: Sang Hoo Dhong, Austin, TX (US); Harm Peter Hofstee, Austin, TX (US); Charles Ray Johns, Austin, TX (US); John Samuel Liberty, Round Rock, TX (US); Thuong Quang Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 09/895,888

(22) Filed: Jun. 29, 2001

(65) Prior Publication Data

US 2003/0005237 A1 Jan. 2, 2003

(51) Int. Cl.$^7$ .............................................. G06F 12/08
(52) U.S. Cl. ........................ 711/146; 711/122; 711/119
(58) Field of Search ................................ 711/119, 122, 711/141, 146

(56) References Cited

U.S. PATENT DOCUMENTS

| | | | | |
|---|---|---|---|---|
| 5,539,895 A | * | 7/1996 | Bishop et al. .............. | 711/138 |
| 6,073,212 A | * | 6/2000 | Hayes et al. ................ | 711/122 |
| 6,564,302 B1 | * | 5/2003 | Yagi et al. .................. | 711/144 |

* cited by examiner

Primary Examiner—Gary Portka
(74) Attorney, Agent, or Firm—Casimer K. Salys; Dillon & Yudell LLP

(57) ABSTRACT

A processor-cache operational scheme and topology within a multi-processor data processing system having a shared lower level cache (or memory) by which the number of coherency busses is reduced and more efficient snoop resolution and coherency operations with the processor caches are provided. A copy of the internal (L1) cache directory is provided within the lower level (L2) cache or memory. The snoop operations and coherency maintenance operations of the L1 directory are completed by comparing the snoop addresses with the address tags of the copy of the L1 directory in the L2 cache. Updates to the coherency states of the copy of the L1 directory are mirrored in the L1 directory and L1 cache. This eliminates the need for the individual coherency buses of each processor that is coupled to the L2 cache and speeds up coherency operations because the snoops do not have to be transmitted to the L1 caches.

21 Claims, 5 Drawing Sheets

SYMMETRIC MULTIPROCESSOR COHERENCE MECHANISM

BACKGROUND OF THE INVENTION

1. Technical Field

The present invention relates to data processing systems in general and, in particular, to improved cache operations within a data-processing system. Still more particularly, the present invention relates to an improved method, system, and processor cache topology that more efficiently supports cache coherency operations within a data-processing system.

2. Description of the Prior Art

A data-processing system typically includes a processor coupled to a variety of storage devices arranged in a hierarchical manner. In addition to a main memory, a commonly employed storage device in the hierarchy includes a high-speed memory known as a cache memory (or cache). A cache speeds up the apparent access times of the relatively slower main memory by retaining the data or instructions that the processor is most likely to access again, and making the data or instructions available to the processor at a much lower latency. As such, caches enable relatively fast access to a subset of data and/or instructions that were recently transferred from the main memory to the processor, and thus improves the overall speed of the data-processing system.

Most contemporary high-performance data processing system architectures include multiple levels of cache memory within the memory hierarchy. Cache levels are typically employed in progressively longer access latencies. Smaller, faster caches are employed at levels within the storage hierarchy closer to the processor (or processors) while larger, slower caches are employed at levels closer to system memory.

In a conventional symmetric multiprocessor (SMP) data processing system, all of the processors are generally identical, insofar as the processors all utilize common instruction sets and communication protocols, have similar hardware architectures, and are generally provided with similar memory hierarchies. For example, a conventional SMP data processing system may comprise a system memory, a plurality of processing elements that each include a processor and one or more levels of cache memory and a system bus coupling the processing elements to each other and to the system memory. Many such systems include at least one level of cache memory shared between two or more processors. To obtain valid execution results in a SMP data processing system, it is important to maintain a coherent memory hierarchy, that is, to provide a single view of the contents of memory to all of the processors.

A coherent memory hierarchy is maintained through the use of a selected memory coherency protocol, such as the MESI protocol. In the MESI protocol, an indication of a coherency state is stored in association with each coherency granule (i.e., cache line) of at least all upper level (cache) memories. Each coherency granule can have one of four states, modified (M), exclusive (E), shared (S), or invalid (I), which can be encoded by two bits in the cache directory. Those skilled in the art are familiar with the MESI protocol and its use to ensure coherency among memory structures.

Each cache line (block) of data in a SMP system typically includes an address tag field, a state bit field, an inclusivity bit field, and a value/data field for storing the actual instruction or data. In current processing systems, both the address tag field and the state bit field are contained in a cache directory. This cache directory may be organized under any caching scheme available, such as fully associative, direct mapped, or set-associative, as are well-known in the art. A compare match of an incoming address with one of the tags within the address tag field indicates a cache "hit."

Current implementation of a coherent Symmetric Multi-Processor (SMP) requires a coherence bus on which all memory transactions that change the state of any of the lines in the caches can be "snooped" (i.e., observed) by all processors. In response to a snoop operation by a processor, all the processors must interrogate their cache directories to identify if the line involved in the transaction was cached in that processor cache. This process may also involve broadcasting of the snoop out to the coherency buses. If a matching directory entry is found, indicating that the cache line is present, the cache line may have to be written back to the next level of cache, written back to main memory, or invalidated, depending on the transaction observed. This coherency scheme has the disadvantage that either the processors must arbitrate for a coherence bus, and thus incur delays, or that a separate coherence bus must be provided for each processor as illustrated in FIG. 1A, requiring the implementation of a large number of external connections (pins) on the limited real estate of the processor.

As shown by FIG. 1A, SMP comprises four processing modules 101A–101D, each having a respective central processing unit (CPU) 103A–103D and level 1 (L1) cache 105A–105D. L1 caches 105A–105D each have an associated L1 directory 107A–107D, which are interconnected to each other via a series of cache coherency buses 111. Cache coherency buses 111 extend from pins (connectors) of processing modules 101A–101D to other pins of the other processing modules and to the L2 cache 109. The number of pins required for the connections and the real estate required for the coherency buses are dependent on the number of processors within the multi-processing system that support coherency operations. Thus, with current 32-way, 64-way, and larger SMPs, the number of required pins and complexity of coherency buses may be prohibitive to further development of large SMPs on progressively smaller real estate.

An alternative coherency scheme currently being utilized provides a "directory-based coherence," by which the state information of the L1 directories is included in the L2 directory. FIG. 1B illustrates this coherency scheme. As shown, L2 directory 156 contains the directory entries of L1 directory 155A–155D. However, since there are typically many more lines in the L2 cache 159 than in the combined L1 caches or processors 151A–151D, the directory-based scheme utilizes more chip area, requires a large amount of storage devoted to coherence, and therefore takes a longer time to interrogate (snoop) the L1 directory because the entire L2 directory 155 has to be viewed.

In light of the foregoing, the present invention recognizes that it would be desirable to provide a processor-cache configuration that supports more efficient coherency operations without requiring additional hardware. A processor-cache configuration that reduces the number of cache coherency buses and associated coherency bus transactions required to support coherency would be a welcomed improvement. These and other benefits are provided by the invention described herein.

SUMMARY OF THE INVENTION

Disclosed is a processor-cache configuration and operational scheme within a multi-processor data processing system having a shared lower level cache (or memory) by which the number of coherency busses is reduced and more efficient snoop resolution and coherency operations with the processor caches are provided. A copy of the processor's internal (L1) cache directory is provided within the lower level (L2) cache or memory. Lower level snoop operations and coherency operations directed to the L1 cache are evaluated and completed utilizing the copy of the L1 directory in the L2 cache. Updates to the coherency states of the copy of the L1 directory are mirrored in the L1 directory and L1 cache. The configuration and operational scheme eliminates the need for the individual coherency buses interconnecting each processor that is coupled to the L2 cache and speeds up coherency operations because the snoops do not have to be transmitted to the L1 caches for initial resolution.

In the preferred embodiment, the L1 directory and L1 directory copy are initialized during system boot. A processor request for update is received and a check is made for a snoop hit in the L2 cache and in the copy of the L1 directory. That is, the snooped addressed is compared against the address tags of the copy of the L1 directory. If a snoop hit occurs in the L2 cache and in the copy of the L1 directory, then the snoop resolution utility of the L2 cache communicates with the processor to resolve the snoop and the L1 directory and the copy of the L1 directory are updated accordingly.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF THE PREFERRED EMBODIMENT

Figure 2:
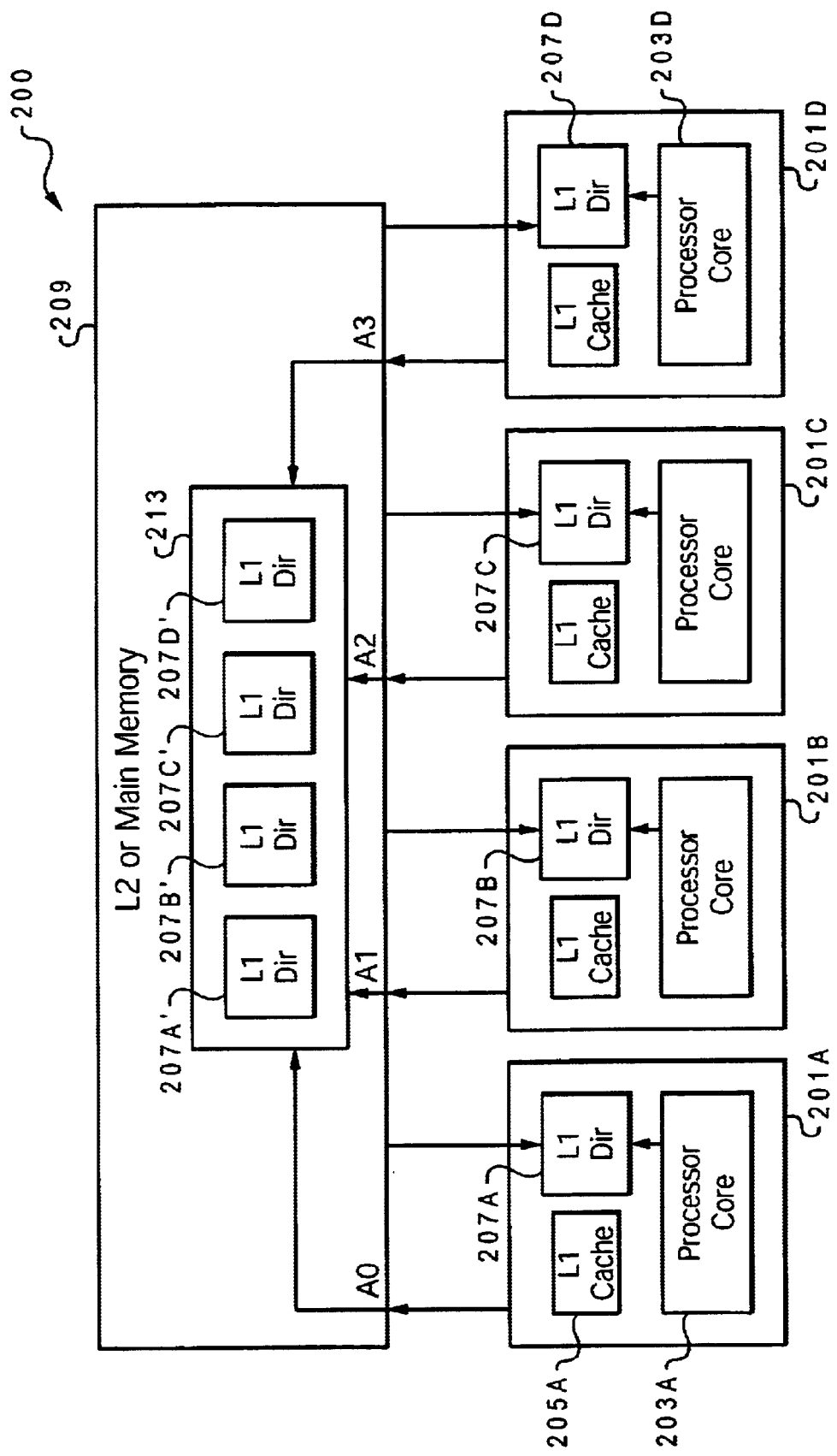
FIG. 2 is a block diagram of a data processing system with modified lower level cache and coherency structure in accordance with a preferred embodiment of the present invention.

The present invention may be implemented in any data-processing system having a cache memory hierarchy that includes a primary, level one (L1) cache and a secondary, level two (L2) cache or memory. Preferably, the data processing system comprises multiple central processing units (CPUs) and associated caches. Referring now to the drawings and in particular to FIG. 2, there is depicted a block diagram of processor-cache components of a data-processing system 200 according to a preferred embodiment of the present invention. Data-processing system 200 includes four processor chips 201A–201D. Each processor chip 201A–201D comprises a CPU (or processor) 203A–203D and an L1 cache 205A–205D. Thus, CPU 203A is coupled to L1 cache 205A, while CPU 203D is coupled to L1 cache 205D, etc. Each L1 cache 205A–205D has an associated L1 directory 207A–207D.

Figure 1A:
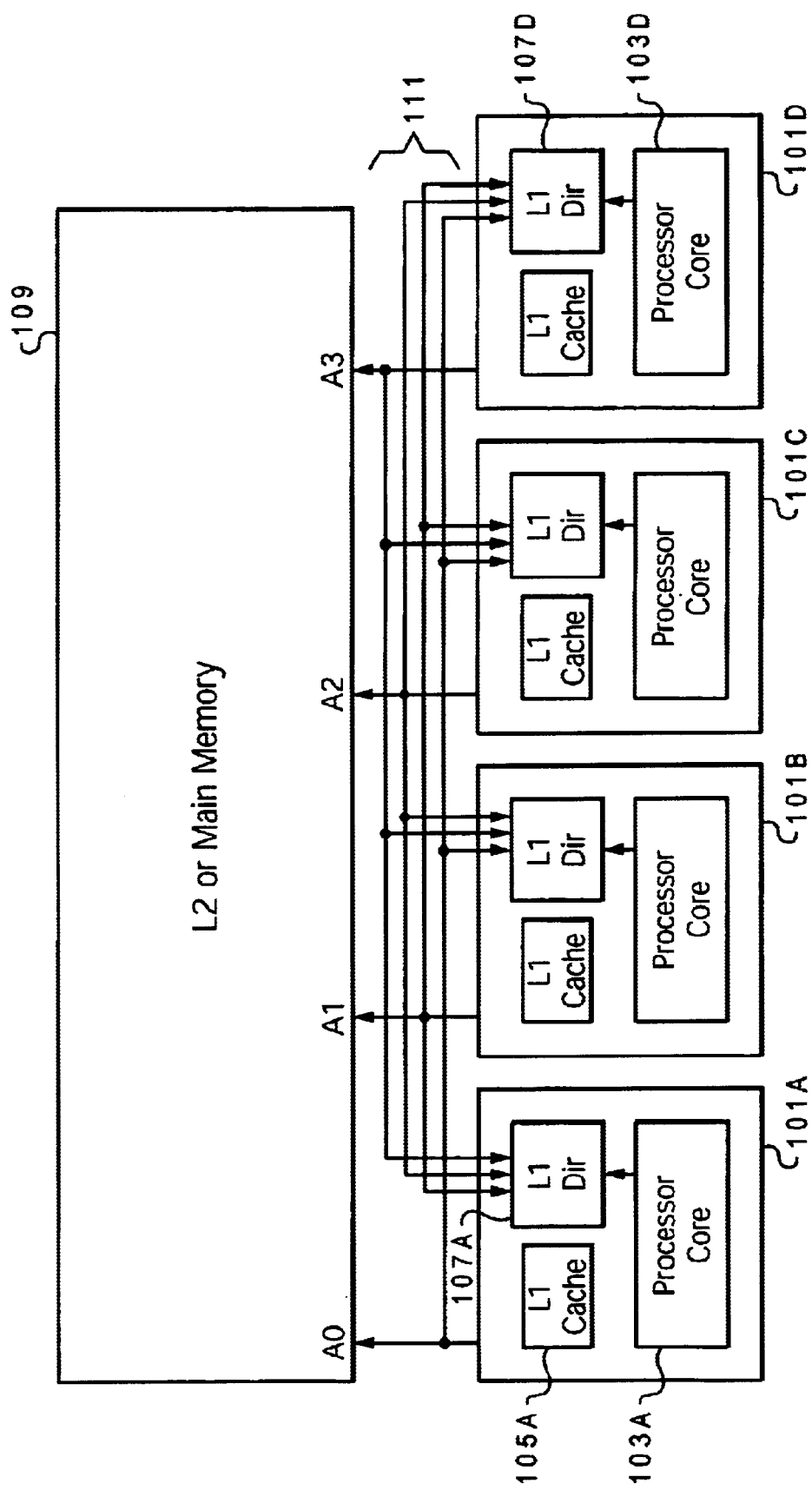
FIG. 1A is a block diagram of a data-processing system with coherency buses according to current multiprocessor systems.
Figure 1B:
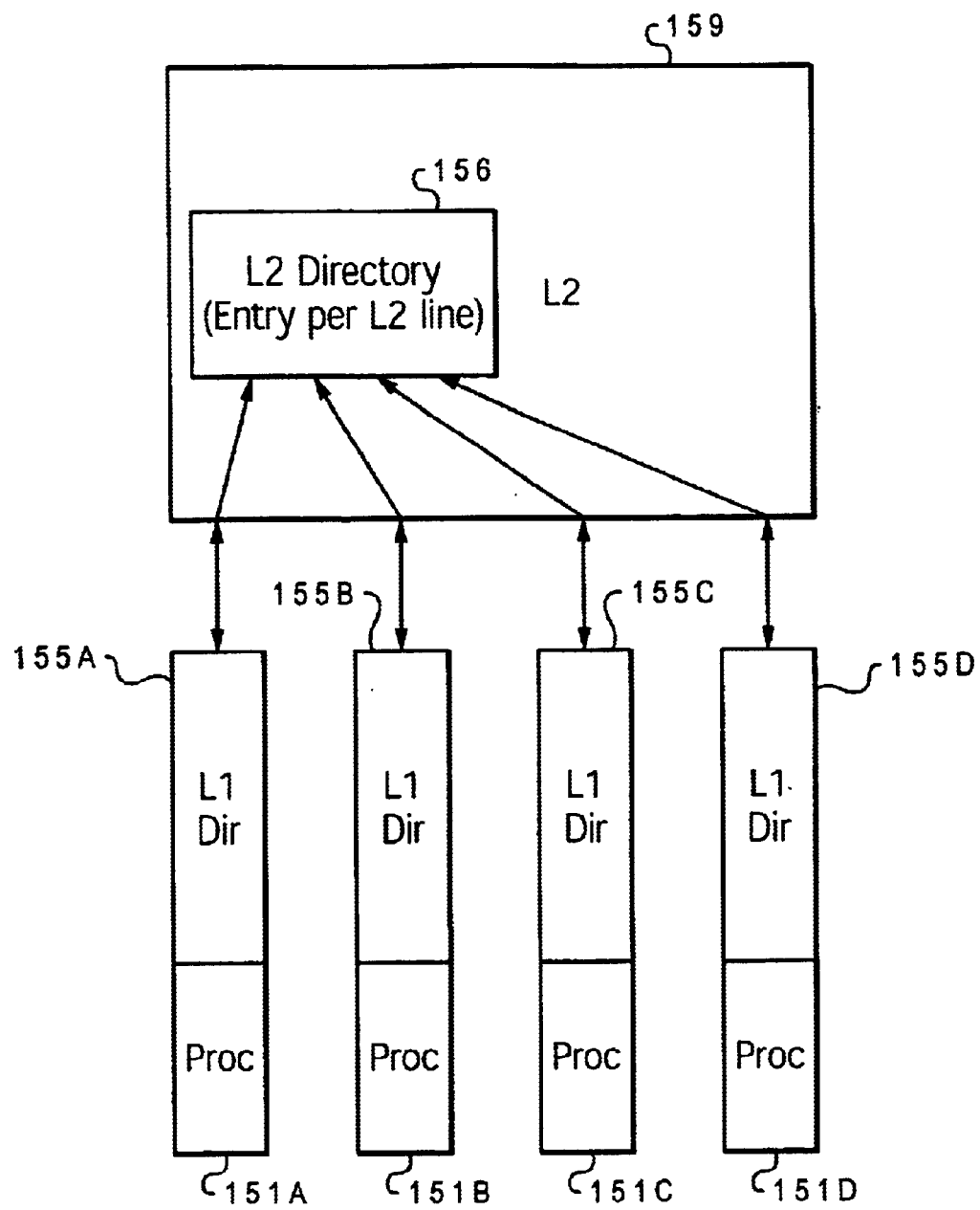
FIG. 1B is a block diagram of a data-processing system with the L1 directory housed within the L2 directory according to another current multiprocessor system configuration.

According to established configuration of multi-level cache hierarchy, each of L1 cache 205A–205D is coupled to L2 cache 209. The illustrated embodiment depicts a single L2 cache 209 providing the lower level memory cache for all four processing units 201A–201D; however the invention is also applicable to configurations that includes separate lower level caches for each individual processing unit or for subgroups of processing units. Unlike the current processor configuration of FIG. 1A, in which the L1 caches 105A–105D are interconnected to each other and to the L2 cache 109 via multiple cache coherency busses 111, the illustrated processor configuration provides a single (point-to-point) bus connection running from each L1 cache 205A–205D to the L2 cache 209.

As illustrated, L2 cache 209 includes a copy 207A'–207D' of each L1 directory 207A–207D. In the preferred embodiment, a pre-determined portion of L2 cache 209 corresponding to the combined sizes of the L1 directories 207A–207D of the L1 caches 205A–205D that are supported by the L2 cache 209 is allocated to storing copies 207A'–207D' of the L1 directories 207A–207D. Precise images of L1 directories 207A–207D are maintained whenever the L1 cache 205A–205D is modified, either by the local processor operations or other external operations. In another embodiment, the copies 207A'–207D' of the L1 directories 207A–207D are stored in a congruent manner so that a single, continuous memory block 213 is allocated within L2 cache 209 for all L1 directories 207A–207D. In another embodiment, the continuous memory block 213 is partitioned to provide logical partitions for each L1 directory.

Although not illustrated, L2 cache 209 may be further connected to other L2 or lower level caches that support intervention amongst caches. L2 cache 209 may also be connected to a system memory via a system-level bus or switch. Thus, although a preferred embodiment of a data-processing system is described in FIG. 2, it is understood that the present invention can be practiced within a variety of system configurations. It should also be noted that the features of the invention are applicable to both inclusive and non-inclusive cache structures, although the preferred implementation occurs within a non-inclusive cache structure.

The present invention provides a new cache configuration and coherency operational characteristic that eliminates the need to issue coherency operations (e.g., snoops) directly to the L1 directories within the processor modules. The invention further reduces the hardware requirements for coherency buses connecting the multiple L1 directories to each other and to the L2 directory or maintaining of a L2 directory within the L2 cache. Specifically, the invention recognizes that coherency operations at the L1 cache are conducted from the lower level (L2) cache via the L1 directory entries and thus mirrors the L1 directory entries (i.e., the address tags and coherency states) within a pre-established memory block in the lower level cache. The processing logic, operating system (OS) kernel, and coherency protocols are modified to complete the following three major transactions:

(1) initialize the directories of each L1 cache and their copies in the lower level (L2) cache such that both are consistent;

(2) maintain the copies of the L1 directories by dynamically updating both copies in a consistent manner whenever a change occurs in the L1 directory; and (3) check for data availability and coherency states of L1 caches during snoop operations, etc. by querying the copy of the L1 directory within the lower level cache.

Initialization of the directories may be completed by copying the initial directory values into a pre-set location in the L2 cache. Alternatively, in the preferred embodiment, the initialization is completed by OS kernel (or other specially provided utility, such as a directory utility) during system boot by marking all lines within the directory and directory copy as invalid. Also, the net result of the operations is the same as directly snooping the L1 directory but requires substantially less coherency bus transactions between the L1 and L2 directories.

In one embodiment, a separate directory utility (or snoop resolution utility) is implemented that performs the copy of the directory and subsequent maintenance of the directory copy within the lower level cache when modifications are made within the L1 directory. Implementation of the directory utility made include some hardware and software aspects. In the preferred embodiment, software coded blocks are utilized to provide the required functionality. The specific coherency operations and/or responses are programmed within the coherency protocol being utilized.

Figure 3:
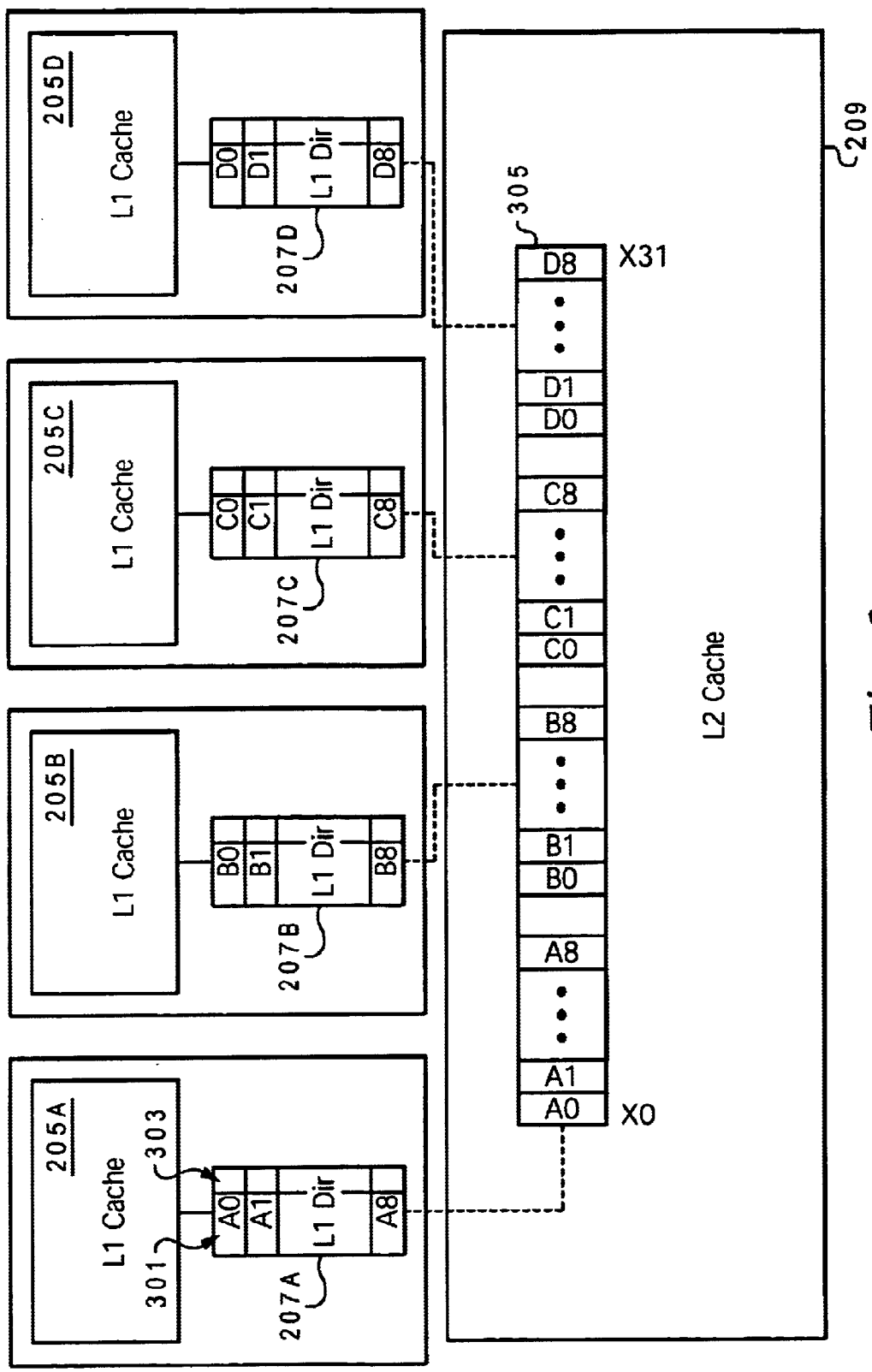
FIG. 3 is a block diagram of an exemplary cache configuration of FIG. 2 illustrating the copy of individual L1 directory entries within L2 cache in accordance with a preferred embodiment of the invention.

With reference now to FIG. 3, there is illustrated a more detailed block diagram of the L2 cache 209 provided in FIG. 2 with an outlay of L1 directory entries in accordance with a preferred embodiment of the invention. As shown, L2 cache 209 comprises 64 cache lines 305 (numbered 0 through 63) for data storage and memory block 305 with 32 L1 directory copy entries (numbered X0 through X31). Each L1 directory 207A–207D comprises 8 directory entries corresponding to the eight cache lines in the associated L1 cache 205A–205D. The L1 directory 207A–207D may be organized under any caching scheme available, such as fully associative, direct mapped, or set-associative, as are well-known in the art. Each L1 directory 207A–207B contains address tag field 301 and state bit field 303. The tag within address tag field 301 may be a full address for a fully associative directory. However, in the preferred embodiment, the tag is a partial address as provided for a direct-mapped directory or a set-associative directory. The bits within state bit field 303 are utilized to maintain cache coherency for the data-processing system.

Because the directory entry contains only a tag and cache state, each entry is made up of a relatively small number of bits of information. Thus, for example, each line may comprise 8 bits of information and storage of all 32 entries (i.e., 8 entries for each of the 4 L1 directories 207A–207B) requires only (8*32) bits of space within the L2 cache. Assuming the L2 cache is only 128 bytes wide, storing the copies of the directories thus requires only two lines of storage space within L2 cache. The size of the directory store is proportional to the size of the L1 caches (i.e., the L1 directories), and not to the size of the L2, and thus, no significant burden is placed on the memory space available within L2 cache. Furthermore, the number of pins required for each processor to support coherency operations is significantly reduced. Additional space may be required for specific tagging information to delineate the directory entries of one L1 directory from the others.

Also, the state changes that occur in the L1 directory are preferably conservative in order to allow for transactions being presently undertaken to be mirrored prior to receipt of a snoop request. This may involve, a temporary holding of the snoop transactions until the present transaction is completed and mirrored within the directory copy. For example, the coherency state on an L1 cache miss for a line that has write permission is charged as follows. When such an operation is encountered, the processor creates room for the new line by invalidating an L1 entry and passing the request to the L2. The L2 resolves coherence on the requested line. Then, the L2 copy of the L1 directory is updated with the new line, and data is passed to the processor, which updates its copy of the L1 directory when the data is received.

According to this invention, the L1 directories are copied in the cache structure, which is part of the L2 cache or main memory. Accordingly, the snoop operations are conducted on the copies of the L1 directories within the L2 cache. That is, the snoop operations are evaluated in the L2 cache and not in the directories located on the processor chips.

Also, because the combined directories can be implemented as one table, a single point of coherence is provided and the coherence protocols are simplified. If a snoop hits in one of the directories, the processors merely need to be instructed which line in their cache directory needs to change state, and the processor may then take the appropriate action. The action taken by the processor is dependent on the transition that occurs in the coherency states. For example, if the cache line transitions from exclusive to invalid, then the processor causes the line to be caste out to the 12 cache. Accordingly, transmitting the full associated address is unnecessary since only the tag address needs to be compared.

L1 directories that support snoop operations are typically implemented as multi-port arrays to prevent delays of the processor (which must interrogate the directory for cache access) for snoop actions on that same directory. Since the area of a directory array is to first order proportional to the number of bits stored, multiplied by the number of ports on the array, no area is lost by implementing a multiport array as multiple distinct copies. The replication of the L1 directories thus provides noticeable benefits in performance, reduced numbers of pins to each processor, and more efficient coherency operations, without requiring any major increases in hardware real estate.

Figure 4:
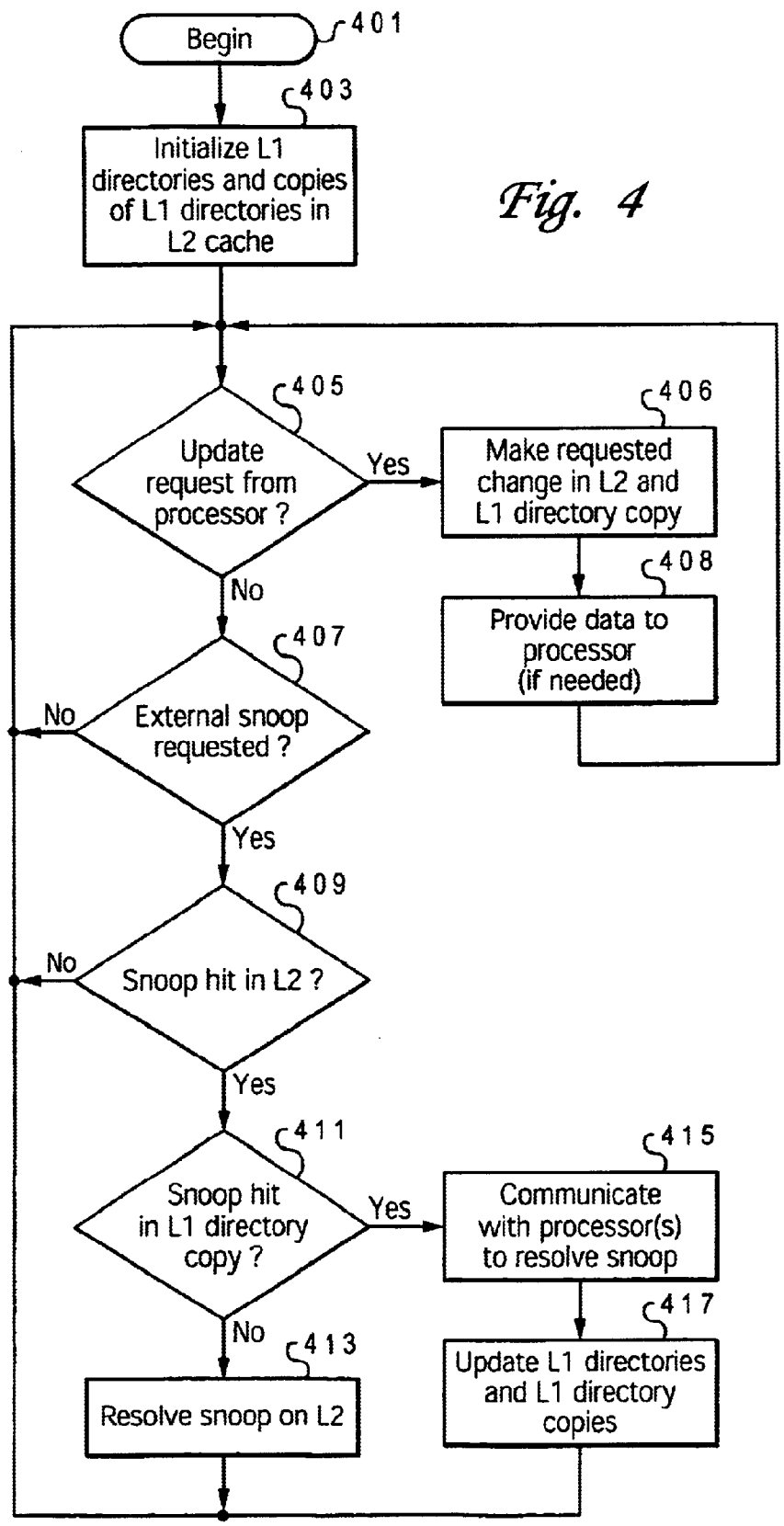
FIG. 4 is a flow chart illustrating the process of completing cache operations and utilizing the data processing system of FIG. 2 in accordance with a preferred embodiment of the present invention.

Referring now to FIG. 4, there is depicted a flow chart of the process of completing a coherency procedure within the new configuration of the processor-cache hierarchy. The process begins at block 401 and thereafter proceeds to block 403, which illustrates initializing the L1 directories and the copies of the L1 directories that are in the L2 cache. This initialization process is completed by the operating system (OS) kernel or a special directory utility executing within the processor and preferably occurs at system (or processor) boot-up or at some other relevant time such as the beginning of execution of a particular application.

Once the L1 directories and directory copies have been initialized, a determination is made as shown at block 405, whether an external snoop (i.e., a snoop from another processor's cache) is requested. If an external snoop is requested, determination is made at block 409 whether a snoop hit occurs in the L2 cache. Following, a next determination is made at block 411 whether the snoop also hit in the copy of the L1 directory. The snoop request is checked against the copy of the L1 directory to determine if the cache line is present in the L1 cache. If a cache miss on the L1 directory occurs, the snoop is resolved on the L2 cache as shown at block 413. If, however, a cache hit occurs on the L1 directory, then communication is established with the processor to resolve the snoop on the L1 cache as depicted at block 415. Following, the L1 directories and L1 directory copies are updated, accordingly (i.e., the corresponding coherency state of the cache line in the L1 directory is updated) as shown at block 417. The process then continues to track and respond to update requests from the processor(s).

If however, no snoop request is received then a next determination is made at block 407 whether a request to update a cache line has been issued from the processor. The processor issues the request to the lower level cache or memory whenever a miss occurs in the L1 cache. The processor(s) makes requests for lines to be read or written or otherwise change state to the L2 (including the L1 directories), and a snoop resolution utility associated with the L2 cache resolves these requests. Accordingly, the L2 cache is informed of any change in the coherency state of a cache line prior to the L1 cache. If the update request from the processor has been issued, then the requested change is made in the L2 cache and the L1 directory copy as indicated at block 406. Then, if necessary, the data is provided to the processor as shown at block 408.

While the invention has been particularly shown and described with reference to a preferred embodiment, it will be understood by those skilled in the art that various changes in form and detail may be made therein without departing from the spirit and scope of the invention. For example, while examples are described with specific reference to the MESI coherency states the invention is applicable to any type of coherency protocol which requires lower level caches to communicate with higher level caches during processing operations. Also, the specific processing system topology having a single on-board processor cache interacting with a level 2 cache is provided only for simplification purposes, and the invention may be implemented within other processing system topologies.

What is claimed is:

1. A data processing system comprising:
   a plurality of processors;
   a first level cache coupled to one of said plurality of processor and having an associated first level directory, said first level directory being a multi-port array having at least one connection pin for coherency operations, with a total number of connection pins for coherency operation that is less than a number of processors that is coupled to a shared lower level cache;
   a second level cache coupled to said first level cache and having a copy of the tag addresses of said first level directory; and
   a cache coherency utility that resolves snoop requests and completes coherency operations for said first level cache utilizing said copy of said first level directory within said second level cache, wherein coherency operation at said copy of the tag address of said first level directories are resolved utilizing only the tag address of the cache line rather than a full associative address.

2. The data processing system of claim 1, wherein said cache coherency utility further comprises means for dynamically maintaining consistent information between both said first level directory and said copy of said first level directory, wherein all changes within said first level directory are mirrored in said copy of said first level directory.

3. The data processing system of claim 2, wherein, in response to a receipt of a snoop request that hits in both said second level cache and said copy of said first level directory, said cache coherency utility communicates with said processor to resolve said snoop request and update said first level directory and said copy of said first level directory.

4. The data processing system of claim 3, wherein said cache coherency utility further includes means for delaying a resolution of said snoop request until a previous modification of said copy of said L1 directory is completed.

5. The data processing system of claim 4, further comprising a next first level cache with an associated first level directory, wherein said second level cache further includes a copy of the first level directory of said next first level cache, wherein further each first level cache is connected to said second level cache via point-to-point bus connection rather than multiple coherency buses.

6. The data processing system of claim 5, wherein respective copies of said first level directories of said first level cache and said next first level cache are stored within a table of said second level cache and each copy is provided a specific tag to identify one first level directory copy from another.

7. The data processing system of claim 5, wherein said first level directories of said first level cache and said next first level cache are stored within said second level cache in a congruent manner.

8. The data processing system of claim 4, wherein said first level cache is an onboard processor cache of said processor, said next first level cache is an onboard processor cache of a next processor of said data processing system, and both said first level directories are each connected to said second level cache via a single coherency bus, wherein all coherency operation amongst said first level directories are transacted with said copies of said first level directories within the lower level cache.

9. The data processing system of claim 1, wherein further each first level cache is connected to said second level cache via point-to-point bus connection rather than multiple coherency buses.

10. A cache memory configuration within a multiprocessor data-processing system comprising:
    multiple first level caches having cache directories and each coupled to a respective one of multiple processors, wherein said first level directory is a multi-port array having at least one connection pin for coherency operations, with a total number of connection pins for coherency operation that is less than a number of processors that is coupled to a shared lower level cache;
    a second level cache connected to said first level caches and having a copy of tag addresses of said first level cache directories of said first level caches; and
    cache controlling mechanism that resolves snoop requests directed at said first level caches utilizing said copies of said tag addresses of said cache directories within said second level cache, wherein coherency operation at said first level directories are resolved utilizing only the tag address of the cache line rather than a full associative address.

11. The cache memory configuration of claim 10, wherein further said cache controlling mechanism includes:
    means for comparing said snoop request with address tags within said copies of said cache directories; and
    means, responsive to said comparing means for transmitting said snoop request up to an associated processor of one of first level caches only when a cache hit occurs at a copy of a cache directory of said one first level cache, wherein coherency operation is transmitted to said processor for completion only when required.

12. The cache memory configuration of claim 11, wherein said cache controlling mechanism is associated with said second level cache and further includes means for maintaining consistent information between said cache directories and said copies of said cache directories, wherein further each first level cache is connected to said second level cache via point-to-point bus connection rather than multiple coherency buses.

13. The cache memory configuration of claim 11, wherein said cache coherency mechanism includes means for delaying resolution of a received snoop request until an ongoing update to a copy of a cache directory is completed.

14. The cache memory configuration of claim 13, wherein said first level caches each has a single coherency bus by which it is connected to said second level cache and wherein all coherency and snoop operations of each said first level caches are transacted via said single coherency bus.

15. The cache memory configuration of claim 10, wherein further each first level cache is connected to said second level cache via point-to-point bus connection rather than multiple coherency buses.

16. A method for providing improved cache operations within a multi-processor data processing system having a first level cache and a lower level cache, said method comprising:

initializing a copy of a tag addresses of a directory of said first level cache, wherein said copy of said directory tag addresses is provided within said lower level cache;

subsequently transacting all snoop requests that are to be resolved at said first level cache utilizing said copy of said directory tag addresses within said lower level cache, wherein coherency operations at said first level directory are resolved utilizing only the tag address of the cache line rather than a full associated address and wherein further said first level directory is a multi-port array having at least one connection pin for coherency operations, with a total number of connection pins for coherency operation that is less than a number of processors that is coupled to a shared lower level cache.

17. The method of claim 16, further comprising copying said directory into said lower level cache during system initialization.

18. The method of claim 16, wherein said initializing step includes concurrently initializing said directory along with said copy of said directory.

19. The method of claim 17, further comprising:

monitoring a receipt from a processor of an update request at said lower level cache; and responsive to said receipt of said update request, which results in an operation that effects modifications to coherency states of said first level cache, dynamically updating said directory and said copy of said directory to reflect said modifications.

20. The method of claim 18, further comprising, responsive to an indication that a present update to said copy of said L1 directory is being undertaken, delaying resolution of a received snoop request until said update is completed.

21. The method of claim 16, wherein further each first level cache is connected to said second level cache via point-to-point bus connection rather than multiple coherency buses.

* * * * *